United States Patent
Sood et al.

(10) Patent No.: US 12,519,835 B2
(45) Date of Patent: Jan. 6, 2026

(54) CONFIDENTIAL COMPUTING ENVIRONMENT INCLUDING DEVICES CONNECTED TO A NETWORK INTERFACE DEVICE

(71) Applicant: Intel Corporation, Santa Clara, CA (US)

(72) Inventors: Kapil Sood, Portland, OR (US); Patrick Connor, Beaverton, OR (US); Scott P. Dubal, Oregon City, OR (US); James R. Hearn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 18/079,558

(22) Filed: Dec. 12, 2022

(65) Prior Publication Data

US 2023/0106581 A1    Apr. 6, 2023

Related U.S. Application Data

(63) Continuation-in-part of application No. 17/845,898, filed on Jun. 21, 2022, now abandoned.

(51) Int. Cl.
*H04L 9/40*     (2022.01)
*H04L 67/10*    (2022.01)
*H04L 67/51*    (2022.01)

(52) U.S. Cl.
CPC .............. *H04L 63/20* (2013.01); *H04L 67/10* (2013.01); *H04L 67/51* (2022.05)

(58) Field of Classification Search
None
See application file for complete search history.

(56) References Cited

U.S. PATENT DOCUMENTS

| | | |
|---|---|---|
| 11,019,033 B1 | 5/2021 | Perlman et al. |
| 12,245,117 B1* | 3/2025 | Scriber ............... H04L 61/4511 |
| 2008/0222711 A1* | 9/2008 | Michaelis ........... H04L 63/0492 |
| | | 726/7 |
| 2017/0041347 A1 | 2/2017 | Nagaratnam et al. |
| 2020/0092254 A1* | 3/2020 | Goeringer ............... H04L 12/66 |
| 2021/0117249 A1 | 4/2021 | Doshi et al. |

(Continued)

OTHER PUBLICATIONS

Microsoft Learn, "Security Management", https://learn.microsoft.com/en-us/windows/win32/secmgmt/primary-and-trusted-domains, Jan. 7, 2021, 371 pages.

(Continued)

*Primary Examiner* — Quang N Nguyen
(74) *Attorney, Agent, or Firm* — Compass IP Law PC

(57) ABSTRACT

Examples described herein relate to extending a first trust domain of a service to a service mesh interface executed in a network interface device and to at least one device coupled to the network interface device. In some examples, extending the first trust domain of the service to the service mesh interface executed in the network interface device and to the at least one device coupled to the network interface device includes causing execution of the service mesh interface in a second trust domain in the network interface device; providing a third trust domain for the at least one device, when connected to the network interface device; and extending the first trust domain into the second trust domain or the third trust domain.

19 Claims, 8 Drawing Sheets

(56) References Cited

U.S. PATENT DOCUMENTS

| | | |
|---|---|---|
| 2021/0135983 A1 | 5/2021 | Farnham |
| 2022/0086148 A1* | 3/2022 | Chaganti ............. H04L 63/0876 |
| 2022/0094690 A1 | 3/2022 | Tarkhanyan et al. |
| 2022/0329573 A1 | 10/2022 | Sood et al. |
| 2023/0205562 A1* | 6/2023 | Basak ................ G06F 13/4221 |
| | | 718/1 |

OTHER PUBLICATIONS

Red Hat, "What's a service mesh?", https://www.redhat.com/en/topics/microservices/what-is-a-service-mesh, Published Jun. 29, 2018, 7 pages.

Final Office Action for U.S. Appl. No. 17/845,898, Mailed Sep. 17, 2024, 17 pages.

First Office Action for U.S. Appl. No. 17/845,898, Mailed Jun. 7, 2024, 26 pages.

\* cited by examiner

CONFIDENTIAL COMPUTING ENVIRONMENT INCLUDING DEVICES CONNECTED TO A NETWORK INTERFACE DEVICE

RELATED APPLICATION

The present application is a continuation-in-part of U.S. patent application Ser. No. 17/845,898, filed Jun. 21, 2022. The contents of that application are incorporated herein in their entirety.

BACKGROUND

Confidential Computing (CC) allows customers to protect their code and/or data while executing workloads in third party computing environments (e.g., hosted clouds) or other environments that are owned and controlled by another party (e.g., infrastructure owner). Hardware-based mediation enclaves or Trusted Execution Environments (TEE) are based on compute nodes running x86 such as Advanced Micro Devices, Inc. (AMD) Secure Encrypted Virtualization-Encrypted State (SEV-ES), Intel® Software Guard Extensions (SGX), Intel® Trust Domain Extensions (TDX), ARM® TrustZone, ARM® Confidential Compute Architecture (CCA), among others.

DETAILED DESCRIPTION

Figure 1:
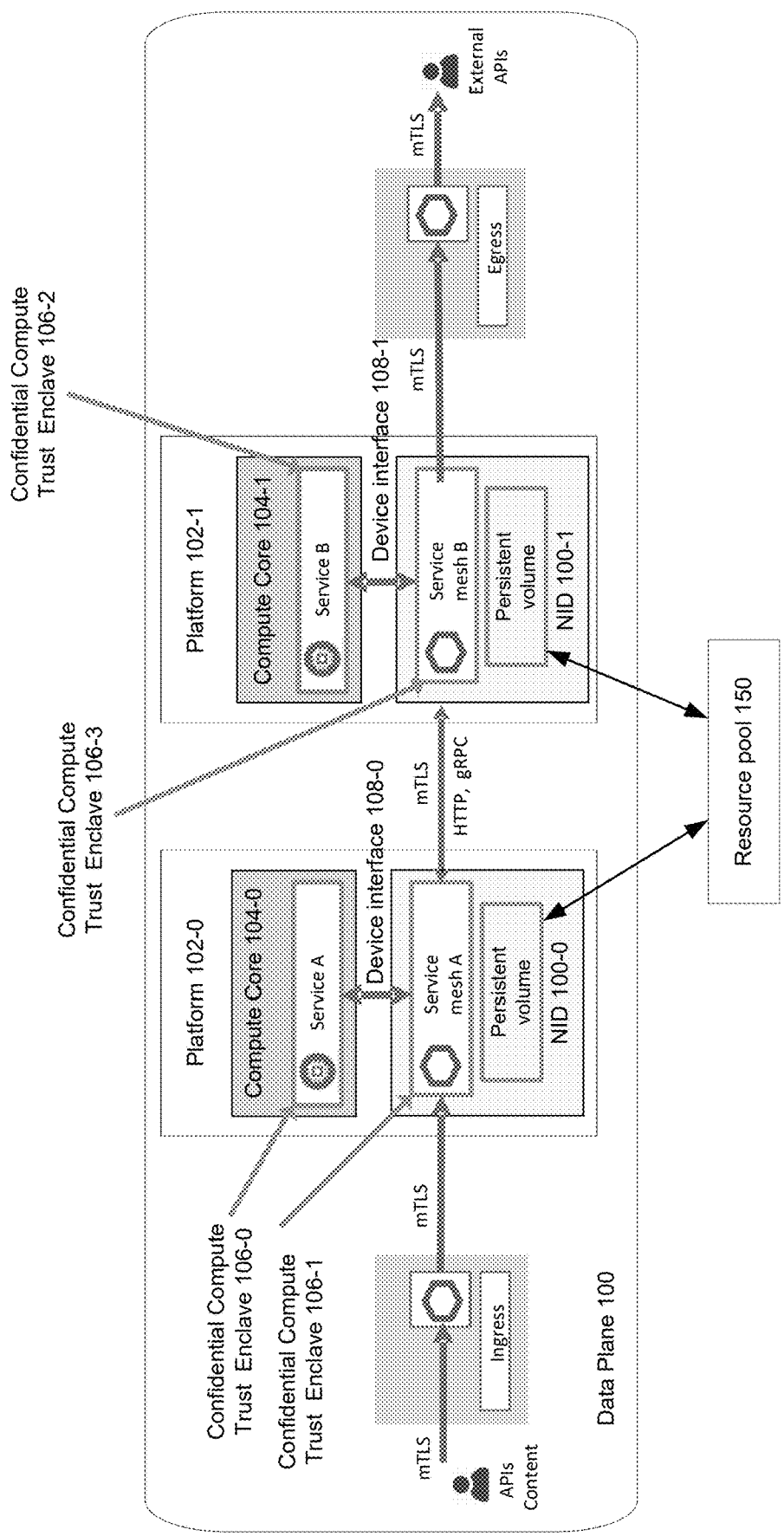
FIG. 1 depicts an example system.

Infrastructure Processing Units (IPUs) are networking devices configured with attachments to storage devices via local area network (LAN), Peripheral Component Interconnect Express (PCIe), or Compute Express Link (CXL). IPUs can include computing cores that execute infrastructure networking operations. IPUs can include network interface devices which perform networking control plane functions such as secure tunneling, inline IPsec, or Transport Layer Security, etc. Customers' confidential computing workloads can run as microservices on central processing units (CPUs) or other processing units (e.g., XPUs) using a cloud native service mesh for communication among workloads. Service mesh components can execute on computing cores of IPUs.

Applications can be orchestrated for execution using an orchestrator (e.g., Kubernetes) to deploy a service mesh endpoint or starting point as integrated into application pods or service mesh as a service. Applications can run on compute nodes (e.g., host server) while an interface to a service mesh (e.g., endpoint or starting point) can run on either the compute node or on the IPU.

Service meshes provide communications among microservices and underlying Mutual Transport Layer Security (mTLS) security, load balancing, scale-out, scale-up, scale-down, and other miscellaneous functionality. A service mesh can include an infrastructure layer for facilitating service-to-service communications between microservices using application programming interfaces (APIs). A service mesh can be implemented using a proxy instance (e.g., sidecar) to manage service-to-service communications. Some network protocols used by microservice communications include protocols such as Hypertext Transfer Protocol (HTTP), HTTP/2, remote procedure call (RPC), gRPC, Kafka, MongoDB wire protocol, and so forth.

Storage applications can offload data transport and storage processing operations to the IPU, which then provide access to the Non-Volatile Memory Express (NVMe) and/or other storage media connected to the IPU. The IPU can present direct attached storage devices for access by a host server. Storage workloads can include bulk storage, databases, or Content Delivery Network (CDN) media.

Some examples create a trust domain and deploy confidential computing workloads in VMs or containers executed on CPUs in communication with a confidential computing service mesh executed on the IPU as well as trusted transport and access to the storage media and/or accelerators connected to the IPU. This deployment model can include multi-tenant, multi-cloud, hybrid-cloud, and edge deployments and may execute on third party (untrusted) hardware, with a lack of physical protections, untrusted infrastructure admins, or for defense in depth purposes, etc. Components of the data center could come from different vendors and could utilize multi-vendor security models such as Intel® SGX or TDX, ARM CCA, AMD-SEV for end-to-end security.

At least to provide a confidential computing environment for workloads executed on processors with an interface to a service mesh executed on a network interface device, and trusted transport and access to the storage media and/or accelerator devices (or other processors) connected to the network interface device, a system and architecture based on cryptographic protections and access controls can construct a scalable security framework. A tenant can utilize the framework to execute confidential computing workloads with a service mesh running on a network interface device to securely access storage and/or other connected devices. Other connected devices can include one or more of: general purpose graphics processing units (GPGPUs), GPUs, field programmable gate arrays (FPGAs), tensor processing units (TPUs), network interface cards (NICs), artificial intelligence (AI) inference or training accelerators, neural network processors (NNPs), XPUs, and other accelerators on a platform or composable server with components coming from multiple vendors or original equipment manufacturers (OEMs).

A confidential compute environment, domain, or enclave can provide a cryptographically protected memory that stores code and data at execution time, memory management, access controls, and trusted input/output (I/O) for microservices, service meshes, and assignable functions of storage device (e.g., NVMe) and/or other connected devices. A microservice executing in a confidential compute environment can use platform security primitives to communicate with corresponding service mesh running in the network interface device and with a specific storage interface (e.g., NVMe) or other device. Attestation (e.g., local or remote) can provide proof to the workload owner of integrity and secure binding across the workload, service mesh, and the storage device. A storage device or other device connected to a network interface device can be accessed as one or more of: SR-IOV virtual function for PCIe or CXL.io, Scalable IOV PASID, and so forth. Services and service meshes can be executed in a Trust Framework, Information Integrity, or Trust as a Service (TaaS) system, solution, or platform.

FIG. 1 illustrates a system. Multiple different tenants can utilize a platform whereby different tenants can execute services in trusted computing environments that communicate with service mesh components executing in trusted computing environments on network interface devices (NIDs) and one or more devices connected to the NIDs. Data plane 100 can include data processing operations by platforms 102-0 and 102-1. Although two platforms are shown, fewer or more than two platforms are available for use. Platforms 102-0 and 102-1 can include compute cores 104-0 and 104-1 communicatively coupled to NIDs 100-0 and 100-1 via respective device interfaces 108-0 and 108-1. A network interface device can refer to one or more of: a network interface controller (NIC), a remote direct memory access (RDMA)-enabled NIC, SmartNIC, router, switch, forwarding element, infrastructure processing unit (IPU), or data processing unit (DPU); as well as physical or virtualized instances thereof.

In some examples, one or more of compute core 104-0 or 104-1 and/or NID 100-0 or 100-1 can be queried by a controller to provide trust domain capabilities or properties that are utilized or capable of being utilized in compute core 104-0 or 104-1 and/or NID 100-0 or 100-1. A controller can include an operating system (OS), hypervisor, orchestrator, or administrator. Based on trust domain capabilities or properties utilized or capable of being utilized in compute core 104-0 or 104-1 and/or NID 100-0 or 100-1, the controller can cause the trust domain with particular properties to be utilized in compute core 104-0 or 104-1 and/or NID 100-0 or 100-1 and cause execution of a service or service mesh in such trust domain in compute core 104-0 or 104-1 and/or NID 100-0 or 100-1 as well as secure interfaces to one or more devices in resource pool 150.

Platforms 102-0 and 102-1 can be implemented as integrated devices whereby compute cores and NIDs are formed on a same system on chip (SoC) or integrated circuitry. Platforms 102-0 and 102-1 can be implemented as disintegrated devices whereby compute cores and NIDs are formed on different system on chip (SoC) or integrated circuitry devices that are communicatively coupled using an interface or interconnect.

Device interface 108-0 and 108-1 can provide encrypted communications based on PCIe, Compute Express Link (CXL), Universal Chiplet Interconnect Express (UCIe), or other connection technologies described herein. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof. See, for example, UCIe 1.0 Specification (2022), as well as earlier versions, later versions, and variations thereof. In some examples, device interface 108-0 and 108-1 can utilize encrypted communications such as PCIe Integrity and Data Encryption (IDE).

Platforms 102-0 and 102-1 can access resource pool 150 as an NVMe device connected via a PCIe link or other connectivity consistent with technologies utilized by device interface 108-0 or 108-1. Examples of resource pool 150 can include persistent memory storage connected via a CXL link, a memory or storage pool connected to multiple platforms, and/or a mix of persistent and volatile memory. Resource pool 150 can include one or more of: AI accelerators, FPGAs, GPUs, GPGPUs, and/or other devices. Resource pool 150 can be accessed as NVMe drives that can be dynamically bifurcated to a number of lanes assigned to one or more service meshes (e.g., service mesh interface A and/or B).

A confidential computing security environment can be utilized for service A and/or service B to access resource pool 150. For example, one or more tenants can execute services (e.g., services A and/or B) within different Trust Domains (TDs) on platforms 102-0 and/or 102-1. A tenant can execute one or more services using different service mesh interface components executing on NID 100-0 and/or NID 100-1. Different services can utilize assigned different TDs and utilize attested, trusted access to a tenant authenticated storage device (e.g., resource pool 150). Services (e.g., workloads) running inside a TD or enclave can access resource pool 150 for different usages such as but not limited to 5G, Secure Access Service Edge (SASE), enterprise and Cloud applications.

For example, Service A can utilize service mesh interface A to receive application program interface (API) communications from another service or to communicate with service B (or other service) via service mesh interface B. For example, service A and B can be implemented as one or more of: microservices, virtual machine (VMs), microVMs, containers, process, thread, or other virtualized execution environment. Similarly, service B can utilize service mesh B to receive API communications from another service or to communicate with service A (or other service).

Service A can execute in confidential compute trust enclave 106-0 or TD in compute core 104-0. Service mesh interface A can execute in confidential compute trust enclave 106-1 or trust domain in network interface device 100-0. Service B can execute in confidential compute trust enclave 106-2 in compute core 104-1. Service mesh interface B can execute in confidential compute trust enclave 106-3 in network interface device 100-1. In some examples, service mesh A can provide communications with service A using an assigned interface to one or more devices in resource pool 150. Similarly, service mesh B can provide communications with service B using an assigned interface to one or more devices in resource pool 150.

Confidential compute environments or trust domains can include or utilize one or more of: Intel® Trusted Domain Extensions (TDX), Intel® SGX Gramine, Intel® SGX Key Management Reference Application, Intel® Trust Domain Extensions TDX, AMD Secure Memory Encryption (SME) and Secure Encrypted Virtualization (SEV), AMD® SEV-ES, ARM® CCA, AMD Memory Encryption Technology, ARM® TrustZone, total memory encryption (TME), multi-key total memory encryption (MKTME), Double Data Rate (DDR) encryption, function as a service (FaaS) container encryption or an enclave/TD (trust domain), Apple Secure Enclave Processor, or Qualcomm® Trusted Execution Environment.

Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key.

When enabled via basic I/O system (BIOS) (or Universal Extensible Firmware Interface (UEFI), or a boot loader) configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system can access portions of memory that are not encrypted by TME.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. Services can be cryptographically isolated from each other in memory with separate encryption keys which can be used in multi-tenant cloud environments. Services can also be pooled to share an individual key, further extending scale and flexibility.

Confidential compute environments can be configured and deployed in multi-tenant environments by a control plane interface to an orchestrator. Configuration of confidential compute environments can include determining if a platform is capable of creating confidential compute environments determining devices to provide confidential compute environments, provisioning of keys for encryption and decryption operations, provisioning certificates to devices and software, and so forth. Keys can be used for software or device attestation. Certificates can be used for software or device authentication.

A service mesh can be created and deployed by a CSP, content delivery network (CDN), or a Communications Service Provider (CoSP) and made available for use by one or more tenants. These tenants can be other CoSPs, roaming agreements based Mobile Virtual Network Operators (MV-NOs), Secure Access Service Edge (SASE) vendors (ZScaler, etc.), or other tenants that pay for service mesh services. Security attestation can be provided by the CSP or CoSP to the tenant, and the tenant can verify the authenticity of the service mesh enclave or Trust Domain (TD) with the CSP/CoSP platform and service mesh software bindings, as described herein. Tenants can execute microservices and use an infrastructure provider's service mesh running on the infrastructure owners' network interface devices in a trust enclave or trust domain. However, the CSP/CoSP may offer the tenant the ability to run a tenant's service mesh on the CPS/CoSP network interface devices. In this scenario, attestation can be verified on a basis of the tenant-provided service mesh software bindings running on the CSP/CoSP infrastructure.

Accelerators in resource pool 150 can be connected to one or more NID 100-0 or 100-1 using a local area network (LAN) (e.g., Network Attached Storage), across platforms (e.g., multi-headed FPGA accelerators, GPUs etc.), or locally on the same platform connected using PCIe or CXL fabric. In addition, a tenant can use an attestation service to verify authenticity of the specific instances of the accelerators assigned to the tenants' virtual functions.

In some examples, tenants can execute their own microservices and use infrastructure provider's SM running on the infrastructure owner's network interface device in an enclave/TD and the owner's accelerators with attestable firmware.

In some examples, the CSP/CoSP may offer the tenant the ability to run tenant's service mesh on the CPS/CoSP infrastructure or network interface devices. In such examples, attestation can be verified on the basis of the tenant provided service mesh software bindings running on the CSP/CoSP. The tenant, in such cases, can utilize its microservices running on the CPU and own service mesh running on the NIDs in CC environment configured by the infrastructure provider. A tenant may also provision their own firmware to the accelerators (or assignable resources of an accelerator).

Examples of services include key management that securely store/retrieve encrypted key tokens from a file system. Examples of services include a database application (e.g., Oracle, Ericsson UDM for 5G subscriber management) running inside an enclave/TD needs to store/access subscriber or customer sensitive data from storage.

Figure 2:
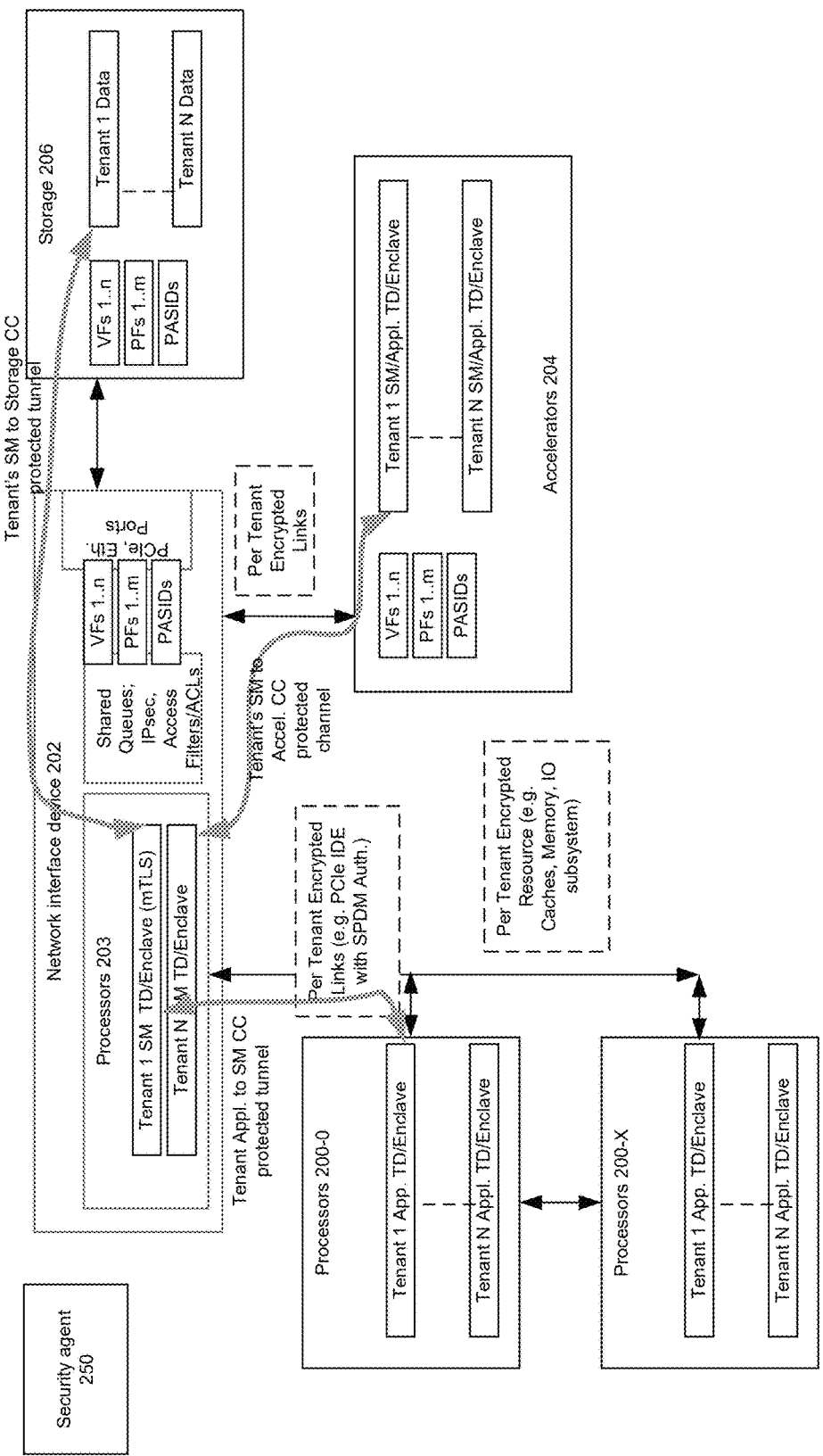
FIG. 2 depicts an example system.

FIG. 2 depicts an example platform. A disaggregated system architecture can include one or more processors 200-0 to 200-X (where X is an integer), one or more on-SoC or discrete accelerators 204, and storage or memory 206 connected by a device interface or connection to one or more network interface devices 202. Network interface device 202 can connect with accelerators 204 and storage 206 (including non-volatile and/or volatile memory) using one or more interconnected links based on PCIe, CXL.mem, CXL.io, CXL.cache, Ethernet, Remote Direct Memory Access (RDMA), or others. CXL and/or PCIe switches can be utilized as well for PCIe peer-to-peer connectivity.

Assignable interfaces to accelerators 204 and storage 206 can be associated with specific service mesh containers by process address space identifiers (PASIDs) as well as Single Root I/O Virtualization (SR-IOV) physical functions (PFs) and virtual functions (VFs), Scalable IO Virtualization (SIOV) assignable device interfaces (ADIs), CXL type 1, CXL type 2, CXL type 3, or Ethernet flow. Multiple service mesh containers can be assigned to assignable resource on the accelerator or storage device. Lane bifurcation for connections between network interface device 202 and accelerators 204 and/or storage 206 can be configured for bandwidth management.

The system can scale out by adding addition devices such as CPUs, storage, memory, and/or accelerators such media decoding or encoding, accelerators for encryption or decryption, and others.

An orchestrator (not shown) can create TD enclaves within one or more of: one or more processors 200-0 to 200-X, one or more on-SoC or discrete accelerators 204 and access data (e.g., read or write) in storage 206. In some examples, applications (App.) (e.g., services) and service meshes can execute within TDs within one or more of: one or more processors 200-0 to 200-X, one or more on-SoC or discrete accelerators 204 and access data (e.g., read or write) in storage 206. For example, Tenant 1's application can execute within processors 200-0 and 200-X and accelerators 204 and access data in storage 206. For example, Tenant 1's service mesh can execute within network interface device 202 and accelerators 204 and access data in storage 206.

However, tenant N-2's application can execute within processor 200-0 and access data in storage 206 and tenant N-2's service mesh can execute within network interface device 202 and accelerators 204 and access data in storage 206. A tenant can include a third party that rents or pays for use of hardware and software services from a CSP or CoSP.

Communication links among processors 200-0 to 200-X, processors 203, accelerators 204, and storage 206 can be created through mutual authentication of components. A root-of-trust for mutual authentication can be based on a per-device or per-software (e.g., microservice or service mesh) private key (e.g., Rivest-Shamir-Adleman (RSA) or Elliptic Curve Digital Signature Algorithm (ECDSA)) and an identity that is configured and managed by an infrastructure owner. Initial boot read only memory (ROM) microcode (p code) or firmware of a device can be authenticated as part of mutual authentication. One or more of the CPUs, NIDs, and storage/accelerator devices can be assigned a private key and a device certificate by a device manufacturer or infrastructure owner in order to authenticate the devices. The device certificate can be assigned per assignable interface, in some examples. Accordingly, a tenant or service mesh function executing on a CPU or NID can authenticate a precise assignable interface.

In some examples, before an application or service mesh can be executed in one or more TDs, attestation of the one or more TDs can take place. Security agent 250 can include a platform root of trust (e.g., Intel Platform Firmware Resilience (PFR), Google Titan, etc.) that can act as single immutable security agent for a disaggregated platform. In some examples, a root-of-trust may be resident in the NID or CPU, in addition, or alternatively. Security agent 250 can be in network interface device 202 or part of one or more processors 200-0 to 200-X. Security agent 250 could operate based on Distributed Management Task Force Security Protocol and Data Model (DMTF SPDM), Trusted Computing Group (TCG) Device Identifier Composition Engine (TCG DICE), or a proprietary algorithm. Security agent 250 can attest software code by comparing code signed with a key against a reference code signed with the key to determine whether there is a match. If there is a match, security agent 250 can attest the code. Security agent 250 could attest a device by collection of device security version (SVN) or device microcode or firmware signed with a key and comparing the SVN or device microcode or firmware signed with a key against a reference SVN or device microcode or firmware signed with a key. If there is a match, security agent 250 can attest the device.

Attestation can bind various sub-components together cryptographically. Security of deployed cloud systems can be tied together with a Common Attestation Service, where one or more of the devices has its own unique identifier (e.g., PCIe bus/device/function/assignable-interface-ID, a service mesh instance ID using image hash, or unique identifier derived from the TCG DICE protocol).

PCIe Integrity and Data Encryption (IDE) can be extended for key derivations that based on additional software instance specific identifiers, e.g., PASIDs, that are unique system wide. A software entity (e.g., CPU containers microservice and service mesh, accelerator interface ID, etc.) can be assigned a unique process identifier (PASID). A PASID could be combined with key material to create PASID-Application—PASID-service mesh—Accelerator Interface ID instance keys. Hence, PCIe traffic on the links can be protected per-instance coupling. Alternatively, per-tenant link traffic can be protected using an encryption key per PCIe IDE.

Security bindings can enable cryptographically isolated execution and communication mechanisms between microservices running on the CPU with corresponding service mesh on the network interface device and provide access to accelerators and/or storage.

After attestation and authentication of devices (e.g., one or more processors 200-0 to 200-X, one or more on-SoC or discrete accelerators 204, or storage 206), devices can perform a mutually acceptable key derivation handshake to provide mutually cryptographically independent sets of keys used for confidentially (e.g., data encryption or decryption), integrity and replay protection of the links used to transmit data between devices. Keys can be generated per tenant in some examples so that multiple applications and service meshes executed for a tenant share use of the same keys. In some examples, keys can be utilized to encrypt data per tenant in storage 206 (e.g., caches, memory, persistent memory, near and far memory, and others).

For example, key derivation handshake can be based on PCIe Integrity and Data Encryption (IDE) where PCIe encrypted communication are made between TDs. See, e.g., PCIe Specification version 5.0 (2020), as well as earlier versions, later versions, or derivatives thereof. Security bindings enable cryptographically isolated execution of applications and service meshes and communication among microservices and microservices-to-service meshes. PCIe IDE can be extended for key derivations based on software instance specific process identifiers that are unique system wide to protect communications based on software identifiers. A software entity (e.g., application, container, microservice, service mesh, etc.) can be assigned a unique process identifier (e.g., PASID). A process identifier can be combined with key material to create PASID-application and PASID-service mesh instance keys. Accordingly, traffic on a link can be protected by encryption using a key based on per-application-service mesh pair, which is more granular than per-tenant encryption keys. Security agent 250 can configure lanes for communication among TDs on different devices for per tenant encrypted links (e.g., PCIe IDE with SPDM authorization). For example, communications between Tenant 1's Application and Tenant 1's service mesh can occur using protected tunnel 212-0 that protects communications by one or more of: IDE, encryption and decryption using PASID-application and PASID-service mesh instance keys, or encryption and decryption using processor 200-0 and processors 203 keys.

Security agent 250 can be implemented as platform firmware or privileged microcode executed by a processor. Examples of processor-executed microcode include Intel SGX or TDX microcode, AMD-SEV microcode, and others. Microcode can be signed, verified, and protected with anti-rollback protection using hardware fuse mechanisms. For example, security agent 250 can cause separation of traffic between different lanes by programming a root complex, input-output memory management unit (IOMMU), and accelerator input output (IO) stacks to configure access controls to lanes. A platform, NID, and devices microcode and firmware can be authenticated by the tenant prior to workload deployment as part of the attestation process, including image hash, Security Version Number (SVN), and mutable and immutable elements.

In some cases, the orchestrator may grant a mutual key based shared memory to be used by the CPU and network interface device CC instances and device memory, in which case, private memories are protected even from other trusted components. Systems can still use system memory which is confidential only to application executing on the CPU, service mesh executing on a network interface device, and devices of the resource pool.

In some examples, an orchestrator can assign a accelerator and/or storage resource's assignable interface to one and only one service mesh element, but an accelerator can support a configurable number of service mesh clients.

Figure 3:
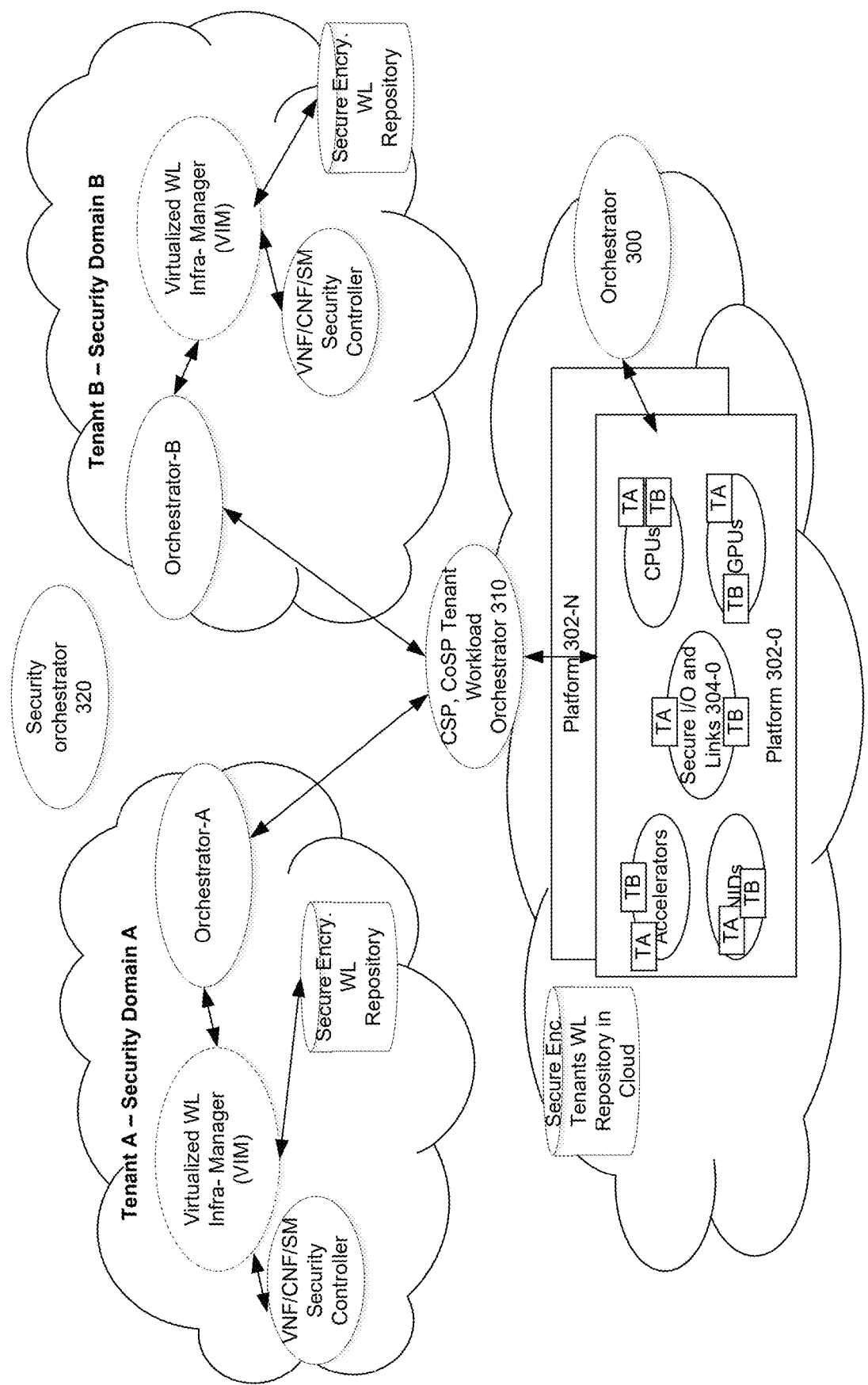
FIG. 3 depicts an example system.

FIG. 3 illustrates the orchestration to deploy and execute the applications and service meshes in trust domains or enclaves with access to devices through a network interface device. Application and service mesh deployments can be provided at least for CoSPs, CSPs, multi-access edge computing (MEC), edge computing, 5G deployments, 6G deployments, in data centers, among others.

One or more enclaves or TDs could co-exist on one or more platforms 302-0 to 302-N, where N is an integer and N≥1. For example, TDs can be based on Intel SGX/TDX, ARM CCA or TrustZone, AMD SEV or AMD Secure Processor. A mesh of interconnected services can be deployed on a multi-tenant and multi-vendor platform and securely communicate with service meshes and devices (e.g., accelerators and/or storage) via hardware protected channels.

For example, tenants A and B can deploy sets of microservices and service mesh (e.g., Envoy side car) and access accelerators on one or more of target platforms 302-0 to N. Target platforms 302-0 to N can be disaggregated and scalable system and operates as a cloud platform inside a CSP/CoSP environment. Multiple microservices can share use of a same service mesh and/or the accelerator. For instance, a tenant may deploy one instance of service mesh (e.g., one of Envoy sidecar, Istio agent, and Istio Certificate Manager) to be used by more than one set of independent tenant microservices. An accelerator can have multiple interfaces which may be assigned to same or different tenants and attestation can be independent for workloads regardless of tenancy ownership.

In some examples, a service mesh and accelerator firmware (e.g., AI models) may be orchestrated and deployed by a CSP or CoSP on a network interface device in CC environments and made available to the tenant(s). Connection to the service mesh and accelerators can be exposed via a set of interfaces for tenant microservices to utilize. A tenant need not deploy a service mesh on network interface device, and provide connectivity with the accelerators.

Security orchestrator 320 can perform remote attestation for tenants to assure system security. Attestation primitives could include Intel® SGX DCAP (Data Center Attestation Primitives), Intel® Attestation services on TDX, Intel® S3M-based attestation, or cloud attestation service as provided by independent software vendors (ISVs) (e.g., Fortanix). Attestation can be performed by one or more devices rooted in hardware.

Tenant A can utilize tenant orchestrator-A to specify security policy for applications and service mesh, perform attestation verification of devices (e.g., platform 302-0 to 302-N) and links (e.g., secure input/output (I/O) and links 304-0 to 304-N) that provide communication among applications, between applications and service mesh, between service mesh and an accelerator or storage, and/or between an application and an accelerator or storage. Tenant B can utilize tenant orchestrator-B in a similar manner as that of orchestrator-A for applications, service mesh, and accelerator or devices.

A tenant can utilize one or more security controller (e.g., virtual network functions (VNF), cloud-native network function (CNF), service mesh) or platform root of trust (PRoT) to attest and authenticate devices and software. For example, security controller 320 can operate as defined by ETSI NFV SEC013 specification. Security controller 320 can perform attestation of TDs. Tenant A can utilize a virtual workload (WL) infrastructure (Infra) manager (VIM) such as Kubernetes to deploy workloads (e.g., microservices) on one or more of platforms 302-0 to 302-N. Similarly, tenant B can utilize a virtualized WL Infra manager to deploy workloads (e.g., microservices) on one or more of platforms 302-0 to 302-N. A VIM can operate in accordance with ETSI NFV defined Virtual Infra-Manager (VIM) (e.g., ETSI GS NFV-MAN 001 V1.1.1 (2014-12)) and include Kubernetes APIs for attestation and TD instantiation and application or SM deployment within TDs. For example, secure encrypted (encry) WL repository can store encrypted microservice, encrypted VM images, encrypted containers, and so forth, for execution in a TD.

Tenant orchestrator-A and tenant orchestrator-B can communicate with CSP/CoSP orchestrator 310 to convey a set of policies and connectivity preferences or requirements for a tenant. CSP/CoSP orchestrator 310 can deploy those policies on the platforms to provide TDs and connectivity within secure I/O and links 304-0 for services or applications of tenants A and B to access service meshes, NIDs, accelerators, GPUs, and/or storage devices. For example, policies can specify particular TD to use (e.g., SGX, TDX, MKTME, TrustZone, and so forth) and whether to select an encrypted image for execution in the TD.

CSP, CoSP tenant workload orchestrator 310 can deploy tenant workloads on platforms and setup TDs per tenant policy as well as attest the TDs (e.g., indicate a TD exists). For example, orchestrator 310 and/or orchestrator 300 can setup trust domains on devices in platform such as accelerators, CPU, GPUs, network interface devices (NIDs) for utilization by microservices and service mesh executed on behalf of tenants A and B. Orchestrator 300 can setup encrypted communications using secure input/output (I/O) and links among devices to provide encrypted communications among devices, among services, and between service and service mesh. A mesh of interconnected confidential computing services can be deployed on a platform and securely communicate via hardware protected channels. Multiple microservices can utilize a single service mesh. For instance, a tenant may deploy one instance of service mesh (e.g., Envoy side car, Istio Agent, or Istio Certificate Manager) to be used by more than one set of independent tenant microservices.

Alternatively, the service mesh may be orchestrated and deployed by the CSP/CoSP on NIDs in TD environments and made available to the tenant(s). The service mesh executing on a NID can expose a set of interfaces for tenant microservices to access the service mesh.

One or more of platforms 302-0 to 302-N may be deployed on-premises (e.g., hybrid-cloud), at the edge (e.g., SmartEdge, Intelligent Edge, or Security and Network Services provided through SASE, 5G/6G), or within a data center.

Figure 4:
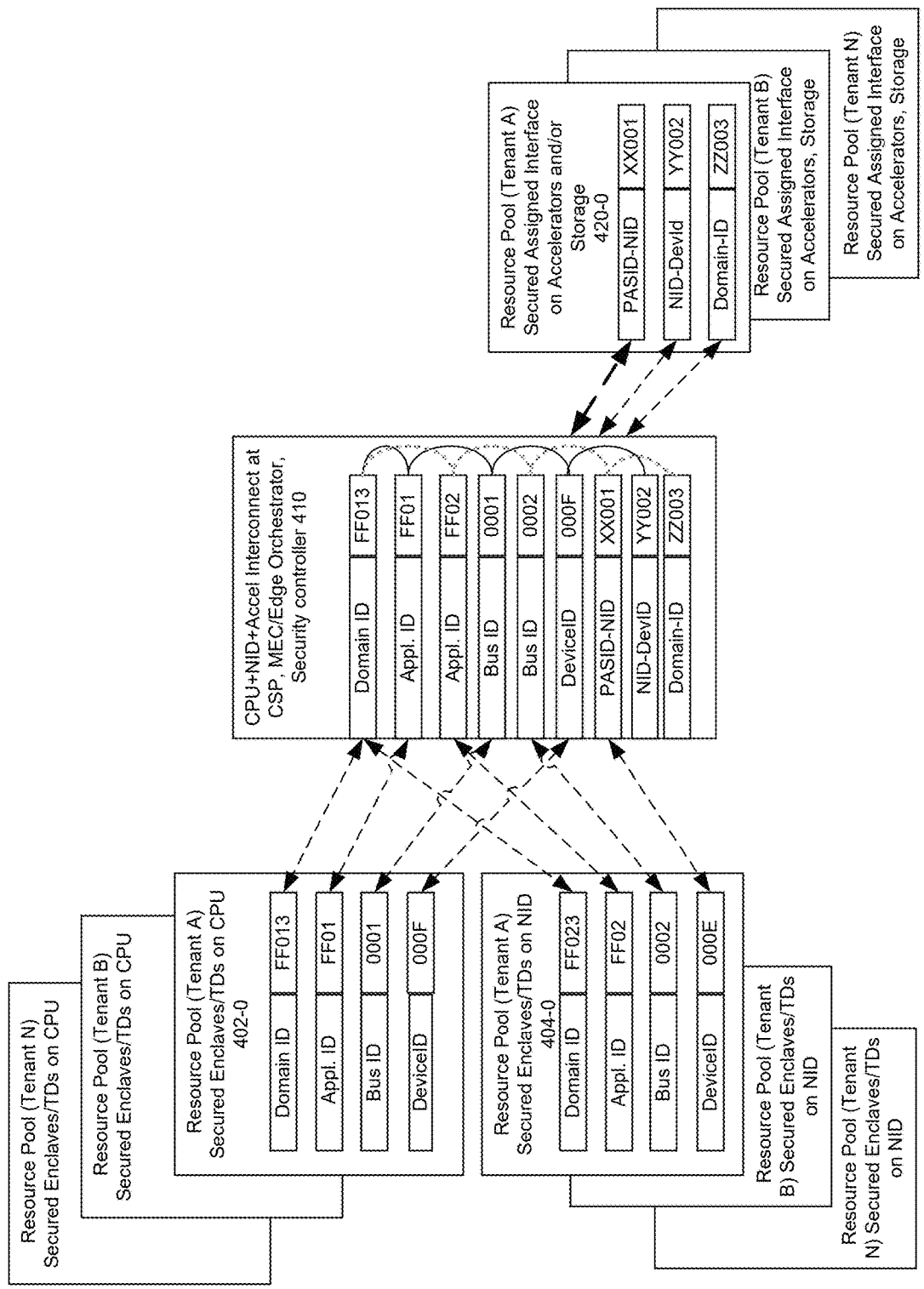
FIG. 4 illustrates an example of linking of identifiers.

FIG. 4 depicts a manner of mapping one or more CPU TDs, SM TDs, and resource pools to one or more tenants. Domain identifiers can identify microservices running on CPUs and service mesh components running on network interface devices. Identifiers can include hardware-based identifiers (e.g., PCIe Address, bus, interface, etc.) and software-based identifiers (e.g., process address space identifiers (PASIDs)). In some examples, an application identifier (Appl. ID) can include a PASID of the application and the PASID can be assigned by an operating system (OS).

The PASID can be used to cryptographically bind a trust domain with a specific instance of an application or service.

Identifiers can identify microservices running on the CPU and Service Mesh component running on network interface devices as well as services running on an accelerator or accessing a storage. For example, identifiers 402-0 to 402-N can identify domain identifiers (Domain ID), application identifiers (Appl. ID), bus identifiers (Bus ID), and device identifiers (DeviceID) for trusted domains environments in processors (e.g., CPUs, GPUs, or others) for tenants A-N. For example, identifiers 404-0 to 404-N can identify domain identifiers (Domain ID), application identifiers (Appl. ID), bus identifiers (Bus ID), and device identifiers (DeviceID) in trusted domains environments in network interface devices for tenants A-N. For example, identifiers 420-0 to 404-N can identify identifiers of interfaces to accelerator and/or storage resources assigned to tenants A to N such as NID PASID (PASID-NID), NID device identifier (NID-DevId), and Domain identifier (Doman-ID). For example, NID PASID can identify a process executed on accelerator and/or storage; NID device identifier can identify a device identifier of the NID that is coupled to the NID device identifier; and Domain identifier can identify a trust domain provided by one or more of the accelerators and/or storages.

In some cases, for a tenant, a CoSP, CSP, Multi-access edge computing (MEC) or Edge Orchestrator, or security controller 410 can assign identifiers to TDs running on CPUs and network interface devices as well as to a resource pool of accelerators and/or storages. Bindings can be composed of hardware-based identifiers (e.g., PCIe address, bus/device/function, etc.) and/or other unique identifiers (e.g., PASIDs). Security controller 410 can maintain bindings to ensure that the correct microservices and service mesh components and resource pools are communicating using the correct trusted assignable device interface. Security controller 410 can maintain bindings per tenant. For example, a binding of the following can indicate a trust domain or CC for a tenant among: CPU Domain ID of FF013, Application ID of FF02, Bus ID of 0002, PASID-NID of XX001, and accelerator and/or storage Domain ID of ZZ003. For example, a binding of the following can indicate a trust domain or CC for a tenant among: CPU Domain ID of FF013, Application ID of FF01, Bus ID of 0001, accelerator and/or storage DeviceID of 000F, and NID-DevID of YY002.

Prior to connection of a compute TD with a network interface TD or resource pool interface, attestation can be requested by a tenant. Identifiers can be used in remote attestation for purposes of security bindings ensured by security controller 410. An attestation quote from hardware can include identifiers, signed by the enclave/TD platform keys, and security controller 410 can remotely verify the identifiers prior to activation of services. An attestation quote from the virtualized network functions (NFs) (or containerized NFs) can be tied to their domain identifier (Domain-ID) and to the network interface device to which they are committed. An orchestrator, security controller, or trusted entity can verify that the identifiers are valid and allocated for use by a combination of compute TD and network interface device TD with resource pool assigned interface. Based on permitted combinations of CPU TDs, NID TDs, and resource pool assigned interfaces, the tenant can be permitted to access the CPU TDs, NID TDs, and resource pool assigned interfaces.

Based on permitted pairing of CPU TDs, NID TDs, and resource pool assigned interfaces, an orchestrator, security controller, or trusted entity can grant a mutual encryption key for microservice and service mesh to access shared memory to read and decrypt data from the shared memory and/or encrypted and write data to the shared memory. Private memories can be protected from access by other trusted components. Pairings of CPU TDs, NID TDs, and resource pool assigned interfaces can use system memory that stores confidential data accessible by decryption solely to the two communicating components (e.g., microservice and service mesh).

Protocols, such as Mutual Transport Layer Security (mTLS), Inter-Process Communication (IPC), google Remote Procedure Call (gRPC), etc. may be utilized for microservice-to-service mesh communications, even in addition to hardware secured channels. After the CC environment for a microservice executing on processor, CC environment for a service mesh executing on a network interface device and assignable devices interface components are mutually trusted and connected, they could be allowed to grant access to the corresponding entity to write directly into private memory or read directly from private memory. Therefore, such systems can use shared memory across processors, network interface device, and accelerator or storage device but memory access by processors, network interface device, and accelerator or storage device can be protected using independent hardware-based memory encryption keys.

Security systems (e.g., 5G, 6G, Secure Edge, Secure Access Service Edge (SASE), Zero Trust, and others) are based on a paradigm that allows applications to securely be filtered, identified, and connected with authorized services. Those services execute as monolithic virtual machines (VMs) or application containers. However, services execution is changing to execution of microservices with underlying networking and security tasks (e.g., Transport Layer Security (TLS), load balancers, scale out/up, etc.) managed by a service mesh.

The 5G Service Based Architecture (SBA) allows 5G control and data plane software to communicate over a Service Based Interface (SBI). For example, 5G control and data plane components can utilize Cloud Native service mesh for communication and be deployed using Kubernetes on the CPU. When 5G Control plane elements (e.g., Session Mediation Function (SMF), etc.) run inside Trusted Domains/Enclaves and using Service Mesh running on the IPU, Confidential Computing security is provided for their workload.

Figure 5:
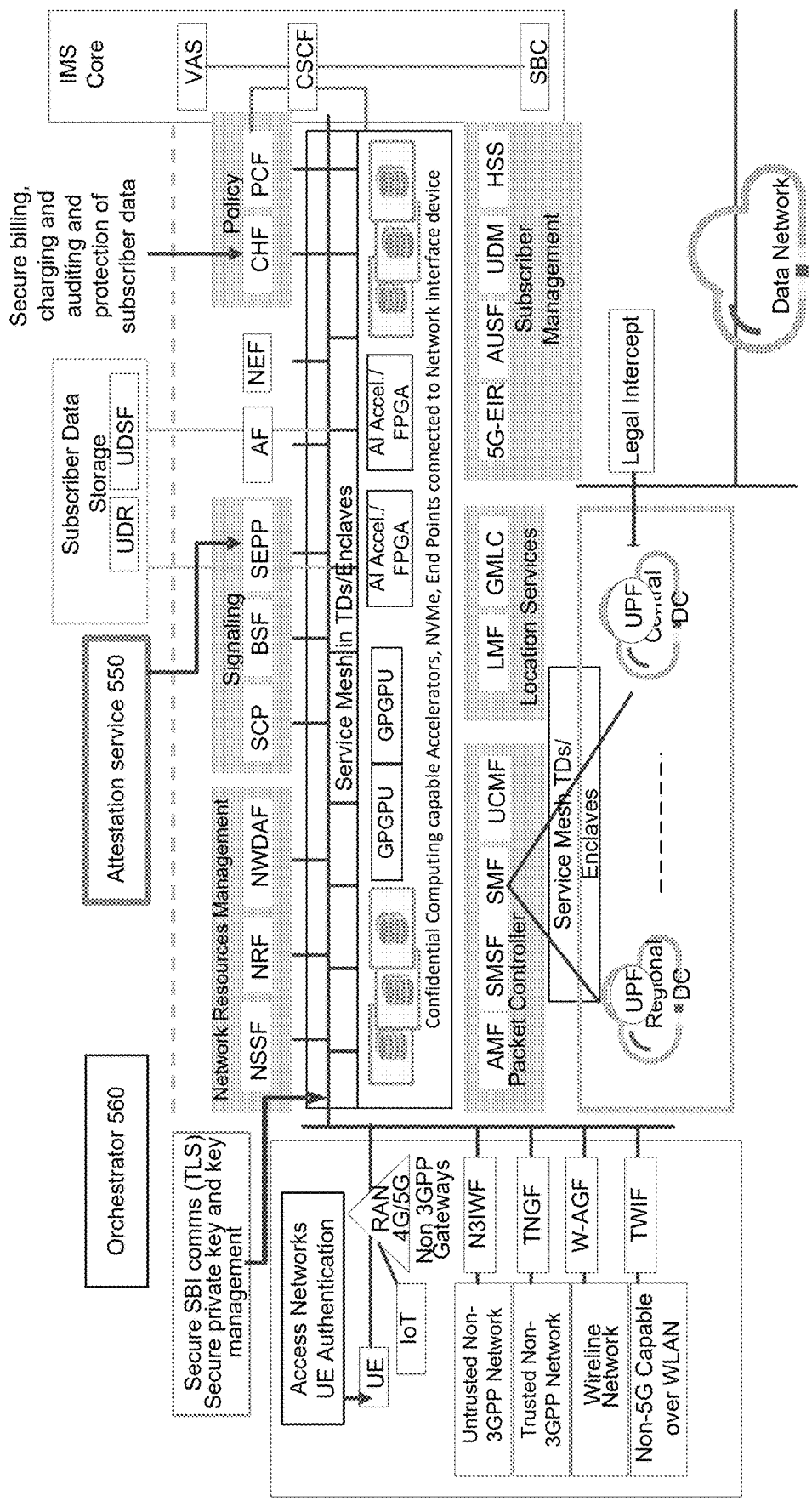
FIG. 5 depicts an example deployment.

FIG. 5 depicts an example 5G, 6G, Secure Edge, Secure Access Service Edge (SASE), Zero Trust and other modern security systems are all based on a paradigm that allows applications to securely be filtered, identified, and connected with authorized services. The system provides a 5G/6G Deployment SM architecture with CC on Control and Data Plane Functions. Those services today run as monolithic VMs or Application Containers; this is already changing with microservices being the core of the application and all underlying networking and security tasks (e.g., mutual TLS, load balancers, scale out/up, etc.) to be managed by Service Mesh, which acts like a common software substrate for all microservices.

Service meshes and 5G/6G control plane functions can be performed in TDs or enclaves. For example, one or more of the following can be executed as applications or microservices in TDs or enclaves: network resource management (e.g., Network Slice Selection Function (NSSF), Network Function Repository Function (NRF), network data analytics function (NWDAF)), signaling (e.g., Service Communication Proxy (SCP), Binding Support Function (BSF), Security Edge Protection Proxy (SEPP)), Application Function (AF), Network Exposure Function (NEF), policy (e.g., Core Charging Function (CHF), Policy Charging Function (PCF)), packet controller (e.g., Core Access and Mobility Management Function (AMF), Short Message Service Function (SMSF), Session Management Function (SMF), UE radio Capability Management Function (UCMF)), location services (e.g., Gateway Mobile Location Center (GMLC), Location Management Function (LMF)), or subscriber management (e.g., 5G Equipment Identity Register (5G-EIR), Authentication Server Function (AUSF), Unified Data Management (UDM), Home Subscriber Server (HSS)). In addition, service meshes can be executed in TDs or enclaves. The service meshes can provide communicative coupling between microservices executing in TDs.

Attestation Service (AS) 550 can issue Attestation Challenges (AC) to one or more of the CC components and then use the signed hardware quotes from responsive components to create a trusted chain of end-to-end CC service. For instance, for a 5G subscriber information security use-case, the UDM function can use a dedicated service mesh agent (e.g., Kubernetes Persistent Volume Claim) which has been assigned an assignable interface to an NVMe drive.

For example, AS 550 can issue a unique challenge to one or more of the CC components (e.g., one or more processors, accelerators and storage, network interface device). CC components can return the same challenge and generated quote and hash signed by the unique hardware key of at least one assignable interface. In addition, an assignable interface may be running different firmware which may be attested as firmware can be unique per assignable interface and can be multi-vendor sourced. In some examples, DMTF's SPDM standards and/or TCG's DICE standard can be used for quote and signing operations. AS 550 can validate the challenge and the quote with the device registration certificate(s) previously obtained from the trusted vendor source (e.g., Intel registration Service). When or after the CC components have been attested, AS 550 can indicate trust status to orchestrator 560 (e.g., Kubernetes) which can bind services with a specific attested service mesh component and the specific device assignable interface.

Figure 6:
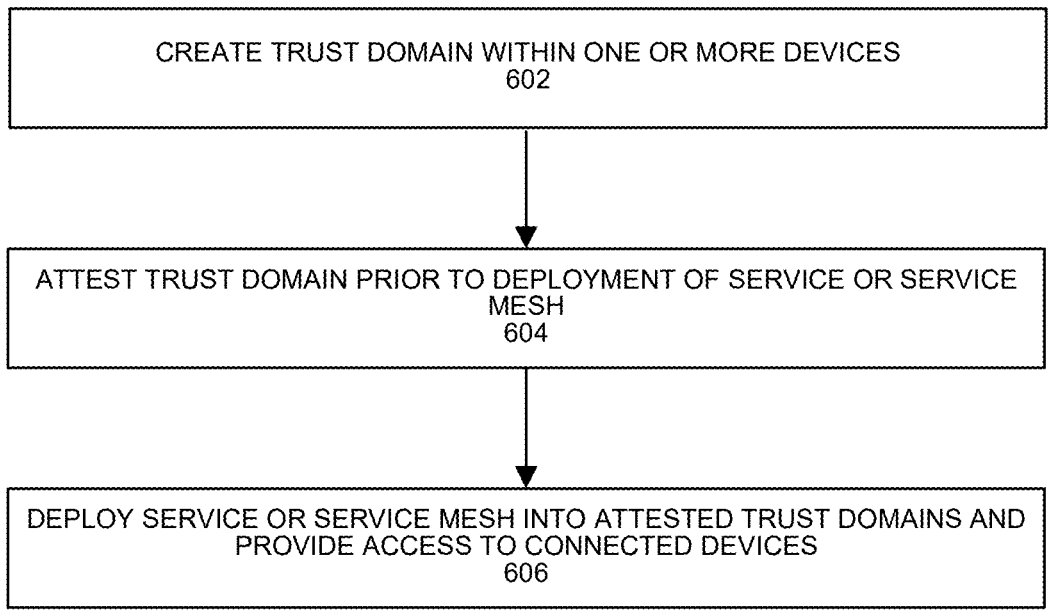
FIG. 6 depicts an example process.

FIG. 6 depicts an example process. The process can be performed by an orchestrator, in some examples. At 602, a trust domain or confidential computing environment can be created in one or more devices. For example, a device can include a CPU, GPU, accelerator, network interface device, interconnect, storage, memory, memory pool, and so forth. Various examples of manners of forming a trust domain and encrypted communications between trust domains are described herein.

At 604, before a service can be executed in a trust domain, attestation of the trust domain can occur. For example, attestation of the trust domain can include identifying that an orchestrator created a trust domain in accordance with policies of a tenant. For example, a security controller can perform attestation of a trust domain.

At 606, based on attestation of a trust domain, a service or service mesh can be deployed for execution within the trust domain on the device. To identify trusted domains, the orchestrator can bind services with a specific attested service mesh component and the specific device assignable interface for access to one or more devices coupled to the network interface device. Thereafter, the service or service mesh can communicate with another service or service mesh in another trust domain using a secure communication such as encrypted communications. In addition, the service or service mesh can communicate with one or more devices coupled to the network interface device.

Figure 7:
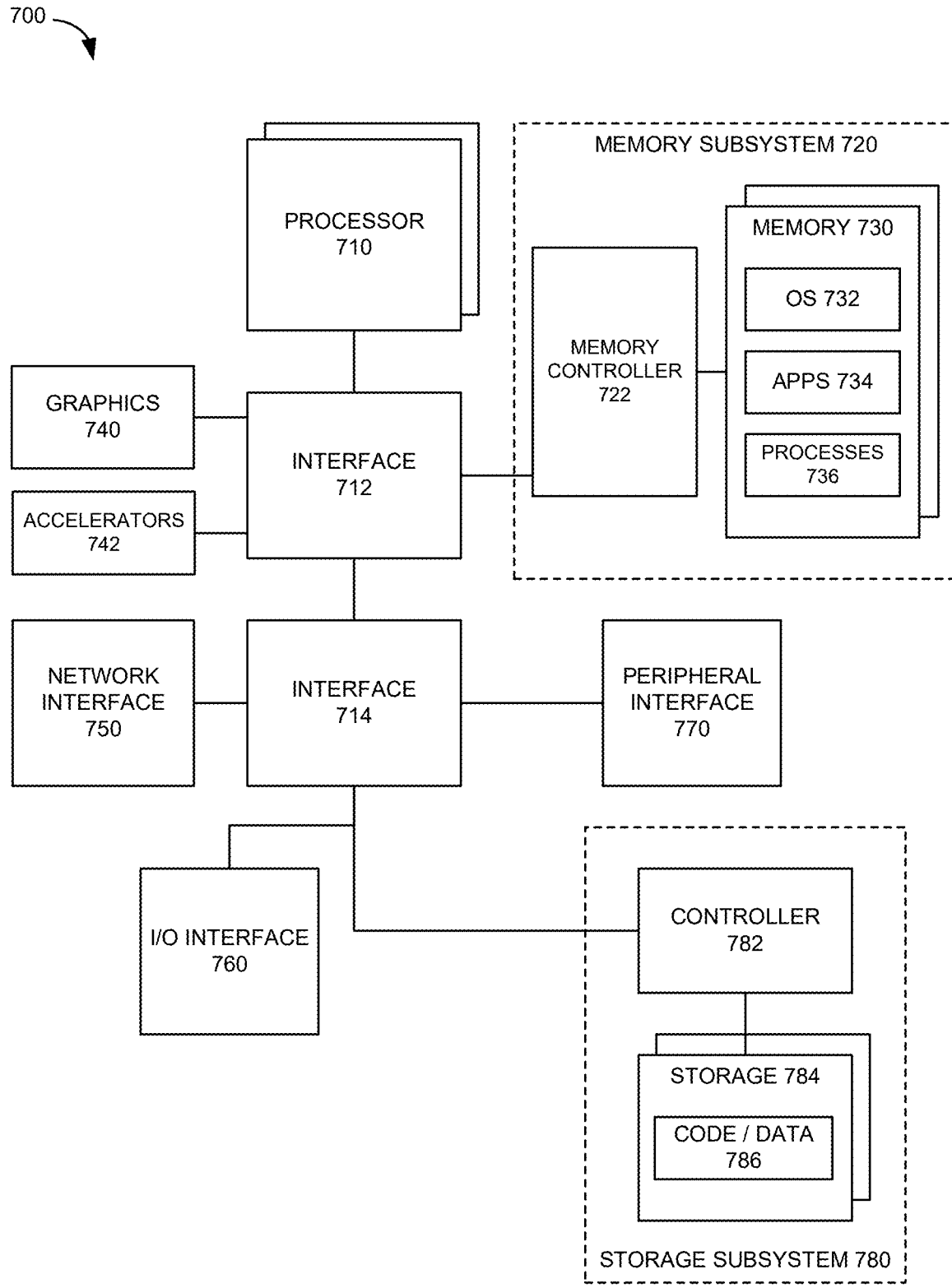
FIG. 7 depicts an example system.

FIG. 7 depicts an example computing system. Components of system 700 (e.g., processor 710, accelerators 742, network interface 750, memory subsystem 720, and so forth) can be configured to provide a trust domain or confidential computing environment for execution of a service or service mesh and access to devices coupled to a network interface device, as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML)

models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include a network interface (e.g., physical layer interface (PHY), media access controller (MAC), interfaces to one or more ingress ports, and/or interfaces to one or more egress ports), an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory.

Network interface 750 can include one or more of: a network interface controller (NIC), a remote direct memory access (RDMA)-enabled NIC, SmartNIC, router, switch, or network-attached appliance. Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. A volatile memory is memory whose state (and therefore the data stored in it) is indeterminate if power is interrupted to the device. A non-volatile memory (NVM) device is a memory whose state is determinate even if power is interrupted to the device. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) (e.g., NVMe-oF specification, version 1.0 (2016) as well as variations, extensions, and derivatives thereof) or NVMe (e.g., Non-Volatile Memory Express (NVMe) Specification, revision 1.3c, published on May 24, 2018 ("NVMe specification") as well as variations, extensions, and derivatives thereof).

Communications between devices can take place using a network that provides die-to-die communications; chip-to-chip communications; circuit board-to-circuit board communications; and/or package-to-package communications.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, cloud and software-defined networking to deliver application workloads across physical data centers and distributed multi-cloud environments).

Figure 8:
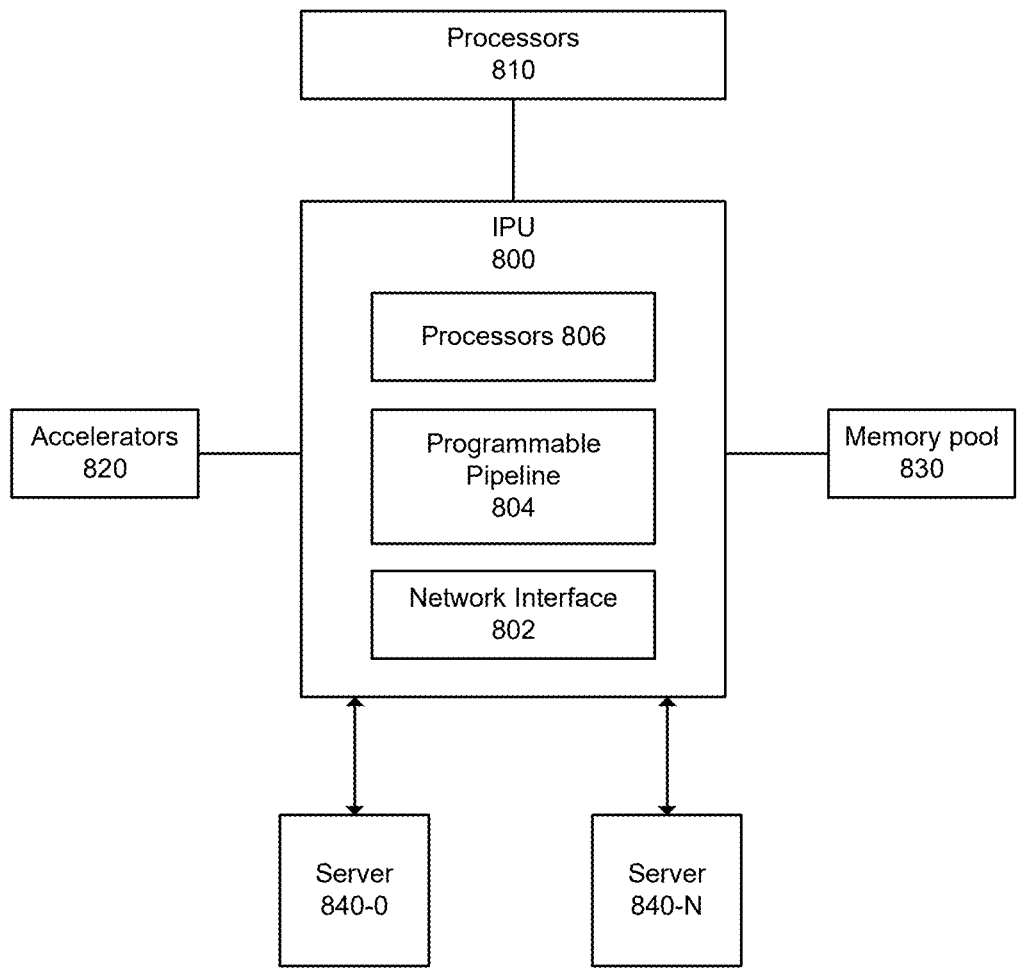
FIG. 8 depicts an example system.

FIG. 8 depicts an example network interface device. Network interface device 800 manages performance of one or more processes using one or more of processors 806, processors 810, accelerators 820, memory pool 830, or servers 840-0 to 840-N, where N is an integer of 1 or more. In some examples, processors 806 of network interface device 800 can execute one or more processes, applications, VMs, containers, microservices, and so forth that request performance of workloads by one or more of: processors 810, accelerators 820, memory pool 830, and/or servers 840-0 to 840-N. Network interface device 800 can utilize network interface 802 or one or more device interfaces to communicate with processors 810, accelerators 820, memory pool 830, and/or servers 840-0 to 840-N. Network interface device 800 can utilize programmable pipeline 804 to process packets that are to be transmitted from network interface 802 or packets received from network interface 802.

Programmable pipeline 804 and/or processors 806 can be configured or programmed using languages based on one or more of: P4, Software for Open Networking in the Cloud (SONiC), C, Python, Broadcom Network Programming Language (NPL), NVIDIA® CUDA®, NVIDIA® DOCA™, Infrastructure Programmer Development Kit (IPDK), or x86 compatible executable binaries or other executable binaries. Programmable pipeline 804, processors 806, and/or memory pool 830 can be configured to provide a trust domain or confidential computing environment for execution of a service or service mesh and access to devices coupled to a network interface device, as described herein.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes at least one non-transitory computer-readable medium, comprising instructions stored thereon, that if executed by one or more processors, cause the one or more processors to: execute an orchestrator to: extend a first trust domain of a service to a service mesh interface executed in a network interface device and to at least one device coupled to the network interface device.

Example 2 includes one or more examples, wherein the extend the first trust domain of the service to the service mesh interface executed in the network interface device and to the at least one device coupled to the network interface device comprises: cause execution of the service mesh interface in a second trust domain in the network interface device; provide a third trust domain for the at least one device, when connected to the network interface device; and extend the first trust domain into the second trust domain or the third trust domain.

Example 3 includes one or more examples, and includes instructions stored thereon, that if executed by one or more processors, cause the one or more processors to: execute the orchestrator to: assign a unique identity per assignable interface for access to the at least one device and perform attestation of the at least one device based on the unique identity and a firmware signature.

Example 4 includes one or more examples, wherein connections based on the assignable interface do not share keys after authentication.

Example 5 includes one or more examples, and includes instructions stored thereon, that if executed by one or more processors, cause the one or more processors to: assign the at least one device to the third trust domain based on authentication of the at least one device.

Example 6 includes one or more examples, wherein the at least one device comprises one or more of: a storage device, accelerator, graphics processing unit (GPU), general purpose GPU (GPGPU), and/or a memory device.

Example 7 includes one or more examples, wherein the service mesh interface is associated with an infrastructure provider and the first and third trust domains are provided for a tenant.

Example 8 includes one or more examples, wherein the service mesh interface is associated with a tenant and the first, second, and third trust domains are provided for the tenant.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 10 includes one or more examples, and includes a method comprising: providing a confidential computing security environment for multiple tenants to execute one or more services within multiple associated trust domains, wherein: one or more services associated with a tenant access a service mesh interface within a trust domain, wherein the service mesh interface is executed by a network interface device and the one or more services associated with the tenant are to access at least one device coupled to the network interface device via at least one secure channel.

Example 11 includes one or more examples, and includes performing attestation to determine whether the trust domain is to be extended to communicate with a trust domain of the service mesh and the at least one secure channel.

Example 12 includes one or more examples, wherein the at least one secure channel is associated with an assignable interface for access to the at least one device.

Example 13 includes one or more examples, and includes performing attestation of the at least one device based on at least one device identity and at least one firmware signature.

Example 14 includes one or more examples, wherein the at least one device comprises one or more of: a storage device, accelerator, graphics processing unit (GPU), general purpose GPU (GPGPU), and/or a memory device.

Example 15 includes one or more examples, wherein the service mesh interface is provided by an infrastructure provider.

Example 16 includes one or more examples, wherein the service mesh interface is associated with the tenant associated with the one or more services.

Example 17 includes one or more examples, and includes an apparatus comprising: a network interface device comprising: at least one processor and circuitry to: execute a service mesh interface in a first trust domain in the at least one processor; provide a second trust domain for one or more devices connected to the network interface device via one or more device interfaces; extend a trust domain in which a service is executed to include the first trust domain and the second trust domain; and transmit one or more packets to the service mesh from the service.

Example 18 includes one or more examples, wherein the circuitry is to: assign the one or more devices to the second trust domain based on authentication of the one or more devices.

Example 19 includes one or more examples, wherein the one or more devices comprise one or more of: a storage device, accelerator, graphics processing unit (GPU), general purpose GPU (GPGPU), and/or a memory device.

Example 20 includes one or more examples, wherein the service mesh interface is associated with an infrastructure provider and the first and second trust domains are provided for a tenant.

What is claimed is:

1. At least one non-transitory computer-readable medium, comprising instructions stored thereon, that if executed by one or more processors, cause the one or more processors to:
execute an orchestrator to extend a first trust domain of a service to a service mesh interface executed in a network interface device and to at least one device coupled to the network interface device;
wherein the extend the first trust domain of the service to the service mesh interface executed in the network interface device and to the at least one device coupled to the network interface device comprises:
cause execution of the service mesh interface in a second trust domain in the network interface device; and
extend the first trust domain into the second trust domain.

2. The computer-readable medium of claim 1, wherein the extend the first trust domain of the service to the service mesh interface executed in the network interface device and to the at least one device coupled to the network interface device comprises:
provide a third trust domain for the at least one device, when connected to the network interface device; and
extend the first trust domain into the third trust domain.

3. The computer-readable medium of claim 1, comprising instructions stored thereon, that if executed by one or more processors, cause the one or more processors to:
execute the orchestrator to:
assign a unique identity per assignable interface for access to the at least one device and
perform attestation of the at least one device based on the unique identity and a firmware signature.

4. The computer-readable medium of claim 3, wherein connections based on the assignable interface do not share keys after authentication.

5. The computer-readable medium of claim 2, comprising instructions stored thereon, that if executed by one or more processors, cause the one or more processors to:
assign the at least one device to the third trust domain based on authentication of the at least one device.

6. The computer-readable medium of claim 1, wherein the at least one device comprises one or more of: a storage device, accelerator, graphics processing unit (GPU), general purpose GPU (GPGPU), and/or a memory device.

7. The computer-readable medium of claim 2, wherein the service mesh interface is associated with an infrastructure provider and the first and third trust domains are provided for a tenant.

8. The computer-readable medium of claim 2, wherein the service mesh interface is associated with a tenant and the first, second, and third trust domains are provided for the tenant.

9. The computer-readable medium of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

10. A method comprising:
providing a confidential computing security environment for multiple tenants to execute one or more services within multiple associated trust domains,
wherein: one or more services associated with a tenant access a service mesh interface within a trust domain, wherein the service mesh interface is executed by a network interface device and the one or more services associated with the tenant are to access at least one device coupled to the network interface device via at least one secure channel; and
performing attestation to determine whether the trust domain is to be extended to communicate with a trust domain of the service mesh interface and the at least one secure channel.

11. The method of claim 10, wherein the at least one secure channel is associated with an assignable interface for access to the at least one device.

12. The method of claim 10, comprising:
performing attestation of the at least one device based on at least one device identity and at least one firmware signature.

13. The method of claim 10, wherein the at least one device comprises one or more of: a storage device, accelerator, graphics processing unit (GPU), general purpose GPU (GPGPU), and/or a memory device.

14. The method of claim 10, wherein the service mesh interface is provided by an infrastructure provider.

15. The method of claim 10, wherein the service mesh interface is associated with the tenant associated with the one or more services.

16. An apparatus comprising:
a network interface device comprising:
a network interface;
at least one processor; and
circuitry to:

execute a service mesh interface in a first trust domain in the at least one processor;

provide a second trust domain for one or more devices connected to the network interface device via one or more device interfaces;

perform attestation to determine whether a trust domain is to be extended to communicate with the first trust domain and the second trust domain;

extend the trust domain in which a service is executed to include the first trust domain and the second trust domain; and transmit one or more packets to the service mesh interface from the service.

17. The apparatus of claim 16, wherein the circuitry is to: assign the one or more devices to the second trust domain based on authentication of the one or more devices.

18. The apparatus of claim 16, wherein the one or more devices comprise one or more of: a storage device, accelerator, graphics processing unit (GPU), general purpose GPU (GPGPU), and/or a memory device.

19. The apparatus of claim 16, wherein the service mesh interface is associated with an infrastructure provider and the first and second trust domains are provided for a tenant.

* * * * *